P. P. STRÖMBERG.
SHIFTING SPANNER.
APPLICATION FILED AUG. 30, 1910.
989,080.
Patented Apr. 11, 1911.
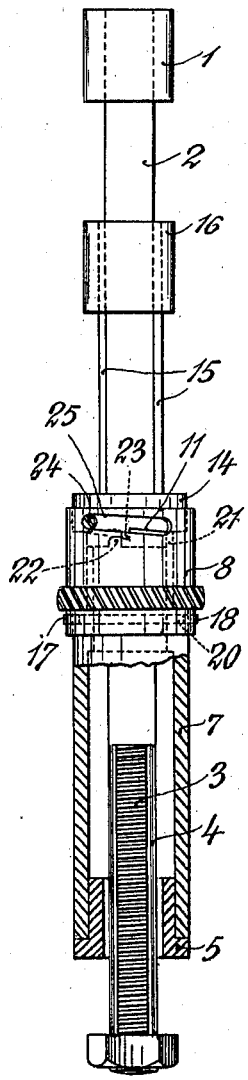
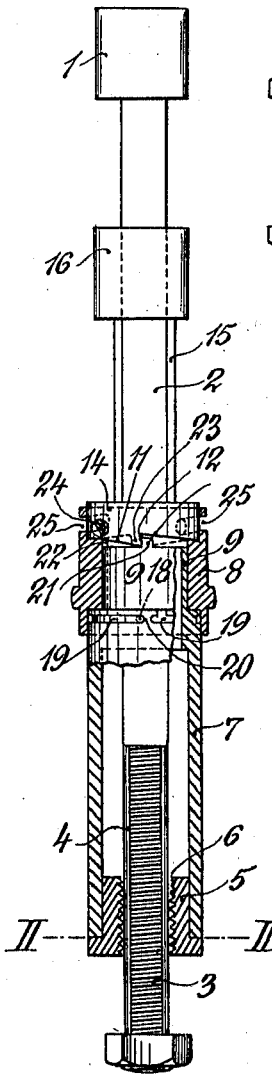
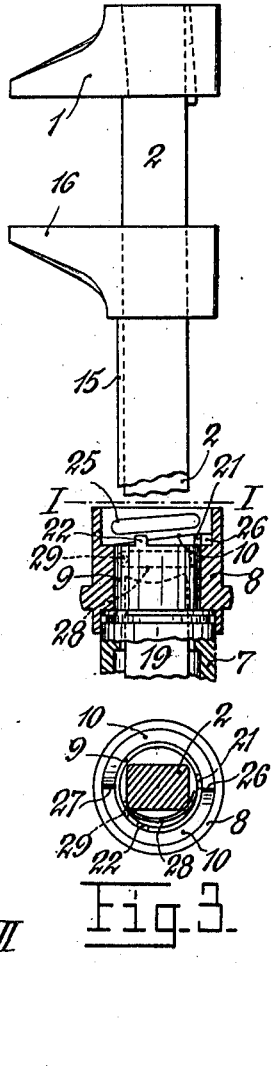
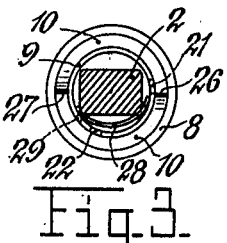
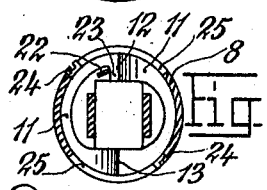
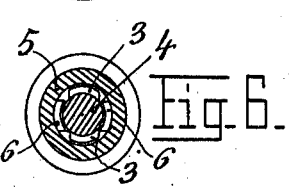
Inventor:
P. P. Strömberg

UNITED STATES PATENT OFFICE.

PEDER PEDERSEN STRÖMBERG, OF GJESAASEN, NORWAY.

SHIFTING SPANNER.

989,080.  Specification of Letters Patent.  Patented Apr. 11, 1911.

Application filed August 30, 1910. Serial No. 579,676.

*To all whom it may concern:*

Be it known that I, PEDER PEDERSEN STRÖMBERG, mechanician, a subject of the King of Norway, residing at Gjesaasen, Norway, have invented new and useful Improvements in Shifting Spanners, of which the following is a specification.

The object of my present invention is a shifting spanner, which quickly and easily may be adjusted to fit each existing nut and again be released by a single operation.

My invention is illustrated in the accompanying drawing, in which:—

Figure 1 is an elevation of the spanner partly in section and shown in its released state. Fig. 2 is a part of an elevation of the left side of Fig. 1 and drawn partly in section some parts being broken away. Fig. 3 is a plan view as seen from the plane I—I in Fig. 2. Fig. 4 is an elevation corresponding to Fig. 1, but showing the parts in a locked state. Fig. 5 is an under side view of the supporting sleeve for the inner jaw together with the finely adjusting sleeve which is shown in section taken at a twisted plane through the inclined slots of said sleeve. Fig. 6 is a cross section on the line II—II in Fig. 1.

The bar 2 carrying the outer jaw 1 is rectangular in section and its free end is provided with screw threads 3, which however are removed at two diametrically located smooth portions 4. The threads are surrounded by a nut 5, which in similar way has incomplete nut threads 6 and is forced into the end of a turnable cylindrical handle 7 provided at the other end with a turnable adjusting sleeve 8. Up into the latter projects a narrower cylindrical part 9 of the handle. This part may be integral with the handle as shown in Fig. 1 or it may be attached thereto in suitable manner, for instance by rivets. On the end remote from the handle 7 the sleeve 8 has two ascending screw surfaces 10 (Fig. 2) located oppositely each other and forming two diametrically disposed offsets 26, 27 (Fig. 3). Quite accordingly, screw surfaces 11 with limiting offsets 12, 13 (Fig. 5) are arranged on a sleeve 14, which through bands 15 surrounding three sides of the bar 2 are connected with and support the inner jaw 16. The screw faces 10 and 11 engage each other, so that the sleeve 14 is displaced longitudinally relatively to the sleeve 8 when the latter is rotated. The sleeve 14 surrounds the bar 2 in such a manner that it cannot be turned thereon.

The adjusting sleeve 8 is provided with two diametrically disposed pins 17, 18 (Fig. 4) projecting into a groove 19 at the end of the handle 7, so that the two parts 7 and 8 cannot be moved relatively in longitudinal direction. The pin 18 in one rotating position abuts against a stop 20, which at the place in question fills out the groove 19 (see Fig. 1).

The sleeve extension 9 is provided in its upper end with two teeth 21 and 22 (see Fig. 3), located at an angular distance of somewhat more than 90 degrees from each other. The said teeth engage alternately one or the other side of an inner tooth 23 (Figs. 1 and 5) on the supporting sleeve 14 in such a manner, that the handle 7 from its released state (Fig. 1), in which the tooth 21 engages the right hand side of the tooth 23, can only be rotated through 90 degrees into locking position in which the tooth 22 engages the left hand side of the tooth 23 (Figs. 4 and 5). Finally the supporting piece 14 is provided with two diametrically arranged screws 24 projecting out into helical slots 25 embracing 90 degrees and arranged at the upper end of the finely adjusting sleeve 8. A curved spring 28 one end of which is attached to the sleeve 9 by a rivet 29 (Fig. 2) has its other end located freely within the sleeve 9 and serves to hold the bar 2 loosely secured when it has been rotated through 90 degrees in clockwise direction from the position shown in Figs. 1–3 into locking position.

The operation of the spanner is as follows: When the parts are in zero or released position (Fig. 1) the incomplete threads 3 and 6 of bar 2 and nut 5 do not prevent the adjustment of the jaws. The inner jaw 16 with the handle 7 is therefore moved out toward the outer jaw 1 until both the jaws engage the sides of the nut. Then the handle 7 is rotated through 90 degrees after having first been moved slightly back, so that intermeshing is obtained between the teeth 3 and 6 located nearest each other. The coarse adjustment now is ready. The two jaws are locked together but their mutual distance is in general slightly larger than the nut width, this distance being, however not more than a pitch (of the threads 3 or 6) too large. The fine adjustment or finally clamping now is made by rotating the sleeve 8 in the same direction as that in which the handle 7 was rotated. Hereby the inclined faces 10 travel on the corresponding faces 11 of the supporting piece 14, so that the inner jaw 16 is forced outward until both jaws securely clamp the nut fast between them. The parts now take up the position of Fig. 4, the sleeve 8 being however, rotated more or less to the right according to the nut width existing in each case. The pressure between the jaws is transmitted from the inner jaw 16 through the parts 15, 14, inclined faces 11 and 10, sleeve 8, handle 7 and threads 6, 3 to the bar 2 and the outer jaw 1.

It is seen, that in the position of Fig. 1 the sleeve 8 cannot be rotated in any direction provided the handle 7 is held fast. If one tends to rotate the sleeve 8 to the right, its pin 18 stops against the abutment 20, and if one tends to rotate it to the left, its offsets 26, 27 stop against the offsets 12, 13 on the supporting piece 14. The sleeve 8 therefore can only be rotated to the right, when the handle 7 has been rotated through 90 degrees to the right into the position of Fig. 4. Further the handle itself on account of the teeth 21, 22 and 23 can only be rotated through 90 degrees in either direction.

When the parts take up the position of Fig. 4, a single operation, viz: a back rotation of 90 degrees of the handle 7 is sufficient to bring said parts back to zero position. By this rotation not only the intermeshing threads 6 and 3 are separated, but during its rotation the abutment 20 always will meet the pin 18 of the sleeve 8 and take the latter with it into initial position, the engagement between the parts 20 and 18 taking place the earlier, the greater angle the sleeve 8 has been rotated during the fine adjustment.

Having now described my invention, what I claim as new and desire to secure by Letters Patent is:—

1. In a universal spanner, the combination of jaws which can be adjusted stepwise in relation to each other, a bar (2) having incomplete screw threads and connected with one jaw (1), a nut (5) coöperating with said threads in order to lock the bar longitudinally or allow its longitudinal adjustment in relation to the nut, a rotatable handle (7) connected with the nut, a sleeve (14) supporting the other jaw (16) and having a fixed tooth (23), two teeth (21, 22) arranged on the handle and coöperating with the fixed tooth (23) so as to permit the handle to be turned through 90 degrees back and forward in relation to the bar carrying the first jaw, a turnable adjusting sleeve (8) inserted between the handle and said supporting sleeve and being provided with helical faces (10), corresponding faces (11) arranged on the supporting sleeve and engaging the first-mentioned helical faces (10), so that the supporting sleeve with its jaw may be moved away from the handle, when the adjusting sleeve is rotated, the supporting sleeve (14) being not turnable in relation to the carrying bar of the first mentioned jaw, a groove (19) provided on the handle, two pins (17, 18) projecting into the groove and attached to the adjusting sleeve (8), and an abutment (20) stopping one pin (18) when the sleeve has been rotated through 90 degrees from the zero position in clamping direction, the said abutment also serving to take with it the adjusting sleeve into the zero position when the handle is rotated for releasing the spanner.

2. In a universal spanner, the combination of jaws which can be adjusted stepwise in relation to each other, a bar (2) having incomplete screw threads and connected with one jaw (1), a nut (5) coöperating with said threads in order to lock the bar longitudinally or allow its longitudinal adjustment in relation to the nut, a rotatable handle (7) connected with the nut, a sleeve (14) supporting the other jaw (16) and having a fixed tooth (23) and two helical faces (11) limited by diametrically disposed offsets (12, 13) said sleeve (14) being not turnable in relation to the jaw carrying bar (2), two teeth (21, 22) arranged on the handle and having an angular distance of about 90 degrees and coöperating with the fixed tooth (23) so as to permit the handle to be turned through 90 degrees back and forward in relation to the bar carrying the first jaw, a turnable adjusting sleeve (8) inserted between the handle and said supporting sleeve and having helical faces (10) limited by diametrically disposed offsets (26, 27) corresponding to and coöperating with the said helical faces and offsets on the supporting sleeve, so that the latter together with its jaw is moved away from the handle when the adjusting sleeve is rotated, said coöperating offsets effecting to prevent any turning of the adjustable sleeve till the handle nut is turned in engagement with its threads, a groove (19) provided on the handle, two pins (17, 18) projecting into the groove and attached to the adjusting sleeve (8), and an abutment (20) stopping one pin (18) when the sleeve has been rotated through 90 degrees from the zero position into clamping position, the same abutment serving also to take with it the adjusting sleeve into the zero position when the handle is rotated for releasing the spanner.

In testimony whereof I have signed my name to this specification in the presence of two subscribing witnesses.

PEDER PEDERSEN STRÖMBERG.

Witnesses:
MOGAN BÜGGE,
KATHINKA PAÜLSSEN.

Copies of this patent may be obtained for five cents each, by addressing the "Commissioner of Patents, Washington, D. C."